(12) United States Patent
Okino et al.

(10) Patent No.: US 6,962,638 B2
(45) Date of Patent: Nov. 8, 2005

(54) METHOD AND APPARATUS FOR PREPARING A DOUBLE GLAZING UNIT

(75) Inventors: Naoki Okino, Yokohama (JP); Yuichi Ueda, Yokohama (JP); Yoshitaka Matsuyama, Yokohama (JP); Masao Ito, Yokohama (JP); Yoki Kobayashi, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 33 days.

(21) Appl. No.: 10/073,870

(22) Filed: Feb. 14, 2002

(65) Prior Publication Data

US 2002/0108694 A1 Aug. 15, 2002

Related U.S. Application Data

(63) Continuation of application No. PCT/JP99/04421, filed on Aug. 17, 1999.

(51) Int. Cl.$^7$ .............................................. C03C 27/00
(52) U.S. Cl. ...................................... 156/109; 156/107
(58) Field of Search ................................ 156/107, 109, 156/99, 538, 539, 578; 428/34; 52/786.1, 786.13

(56) References Cited

U.S. PATENT DOCUMENTS 4,708,762 A * 11/1987 Lenhardt .................... 156/556
5,051,145 A * 9/1991 Lenhardt ...................... 156/99

FOREIGN PATENT DOCUMENTS

JP 61-66415 4/1986
JP 10-158041 6/1998

OTHER PUBLICATIONS

Written Translation of JP 10–158041.*

* cited by examiner

*Primary Examiner*—Jessica Rossi
(74) *Attorney, Agent, or Firm*—Oblon, Spivak, McClelland, Maier & Neustadt, P.C.

(57) ABSTRACT

Two glass sheets are moved in a horizontal direction between a first stage and a second stage by a pushing and pulling device while having a certain gap maintained between the two glass sheets by a holder and having lower edge surfaces of the two glass sheets supported by a guide. A die is provided between the first stage and the second stage so as to be movable in a vertical direction. A resin material is injected in a peripheral edge between the two glass sheets by injecting the resin material from the die onto the peripheral edge between the glass sheets while carrying out alternatively the horizontal movement of the two glass sheets and the vertical movement of the die. A double glazing unit is prepared by forming a resin spacer in the peripheral edge between the two glass sheets while maintaining the certain gap between the two glass sheets.

19 Claims, 13 Drawing Sheets

METHOD AND APPARATUS FOR PREPARING A DOUBLE GLAZING UNIT

This application is a continuation of PCT/JP 99/04421 filed Aug. 17, 1999.

TECHNICAL FIELD

The present invention relates to a method and an apparatus for preparing a double glazing unit, in particular a method and an apparatus for preparing a double glazing unit, which has a single resin spacer provided in the entire peripheral edge between two glass sheets.

BACKGROUND ART

A multi-sheet glazing unit has a hollow space formed between two adjacent glass sheets. The hollow space is formed by providing a spacer in the circumferential edge between two adjacent glass sheets. The multi-sheet glazing unit has a high heat insulating property and a sound insulating property.

Some of double glazing unit spacers are molded from a resin material. As the method for preparing a double glazing unit, there is the following method. This is a method wherein two glass sheets are relatively moved with respect to a die for injecting a resin material while the glass sheets are supported so as to have a certain gap maintained therebetween, and a resin material is injected into the peripheral edge between the two glass sheets to form a resin spacer.

In JP-A-7-17748, a conventional method for preparing a double glazing unit is disclosed. This method is as follows: Positioning rollers are provided between parallel edges at two sides of a unit of two rectangular glass sheets to maintain a certain gap between the two glass sheets. While the unit and a die are relatively moved in this state, a resin material is injected from the die to form spacers between parallel edges at the remaining two sides of the unit where the positioning rollers are not provided. Subsequently, the positioning rollers are removed, and the resin material is injected from the die to form spacers between the parallel edges at the two sides of the unit where the positioning rollers have been provided. This method fundamentally deals with two glass sheets in horizontal fashion.

However, this method raises the following problems. The spacers have connections at four locations since spacers are formed in the parallel edges at the remaining two sides of the unit of the two glass sheets after spacers have been formed in the parallel edges at the two sides of the unit. The presence of many connections in the spacers increases the frequency of degrading the air tightness in a hollow space. In that case, the glass sheets are apt to be clouded up since moisture comes into the hollow space. Additionally, the heat insulating property and the sound insulating property of the double glazing unit degrade.

In this method, it is necessary to maintain the gap by the positioning rollers and so on in order to deal with two glass sheets in horizontal fashion. The glass sheets, which are supported in horizontal fashion, are apt to have central portions deflected downwardly by their own weight. From this viewpoint, dealing with glass sheets in horizontal fashion is not appropriate for a method for forming a spacer by injecting a resin material into the peripheral edges between two glass sheets while maintaining a certain gap between the glass sheets.

A proposal is provided wherein a resin material is injected into the peripheral edge between two glass sheets to form a spacer therein while holding the two glass sheets in vertical fashion.

FIG. 16 is a side view showing an example of the method for preparing a double glazing unit, wherein two glass sheets are dealt with, being held in vertical fashion. FIG. 17 is a perspective front view as viewed from an upper left position in FIG. 16. Two glass sheets 1 and 2 are sucked by a plurality of suction pads 4 provided on a suction supporting frame 3 and are held in substantially vertical fashion on rollers 5 so as to maintain a certain gap therebetween. The faces of the glass sheets 1 and 2 sucked by the suction pads 4 are ones opposite to the confronting faces of the glass sheets 1 and 2. A supporting leg 3a of the suction supporting frame 3 runs along a guide (not shown). Thus, the glass sheets 1 and 2 move in a horizontal direction parallel to the faces of the glass sheets, maintaining the certain gap therebetween. A die 6, which injects a resin material, confronts edges of the glass sheets 1 and 2. FIG. 15 is an enlarged side view of the die 6. The die 6 has a receiving portion 8 formed therein to accept edges of the glass sheet 1 and 2. The die 6 is provided with retainers 9 for glass sheets, which get contact with the faces of the glass sheets 1 and 2 opposite to the confronting faces.

The receiving portion 8 of the die 6 has a central portion formed with a resin injection port 10, which is open toward an edge between the glass sheets 1 and 2 in touch with the retainers 9. The resin injection port 10 has a resin conduit 11 communicated therewith. The die 6 is connected to an extruder (not shown) through a resin supply tube 13 with a swivel joint 12. To the resin conduit 11 is supplied a resin material from the extruder. The die 6 can be vertically moved by a driving electric motor and the like along a linear rail (not shown) vertically provided. The die 6 can rotate at 90 deg. intervals about the axis of the die 6 by an electric motor and the like (not shown) (FIG. 15).

Now, the production step for a double glazing unit will be explained. The suction supporting frame 3 moves in the left direction. After the right vertical edges of the glass sheets 1 and 2 have passed under the die 6, the die 6 lowers. With the right vertical edges of the glass sheets 1 and 2 being supported by the retainers 9 in the receiving portion 8 of the die 6, the die 6 rises, injecting the resin material from the resin injection port 10. The resin material is injected into the right vertical edge between the glass sheets 1 and 2 by the rising operation of the die 6.

When the die 6 has risen to the upper ends of the right vertical edges of the glass sheets 1 and 2, the die 6 stops rising. When die 6 has stopped, the die rotates by 90 deg. in the counterclockwise direction. After that, the glass sheets 1 and 2 move in the right direction along with the suction supporting frame 3. Since the resin material is being injected from the resin injection port 10, the resin material is injected into the upper edge between the glass sheets 1 and 2 by the movement of the glass sheets 1 and 2.

Thus, the resin material is continuously injected into the peripheral edge between the glass sheets 1 and 2 to form a spacer having a single connection in the peripheral direction.

However, the production method for a double glazing unit stated above has the following problems. When the glass sheets 1 and 2 are large, the suction supporting frame 3 is required to be formed in a large size. When the glass sheets 1 and 2 are small as shown by a chain double-dashed line in FIG. 17, the number of the suction pads 4, which suck and hold the glass sheets 1 and 2, decreases which leads to unreliable holding of the glass sheets 1 and 2.

Additionally, the movement of the die 6 and the movement of the supporting leg 3a interfere with each other. Further, the glass sheets 1 and 2 have poor accuracy in maintaining the gap and in positioning.

It is an object of the present invention to provide a method and an apparatus for preparing a double glazing unit, capable of controlling the positioning of two glass sheets with good accuracy without having any interference with a die when moving the glass sheets with a certain gap maintained therebetween.

DISCLOSURE OF THE INVENTION

The present invention provides a method for preparing a double glazing unit, which comprises supporting two glass sheets so as to maintain a certain gap therebetween, and injecting a resin material from a die to form a resin spacer in a peripheral edge between the two glass sheets while relatively moving the two glass sheets and the die so as to move the die along the peripheral edge between the two glass sheets, the die injecting the resin material in a certain sectional shape; characterized in that the method comprises providing the die between a first stage and a second stage, the first stage having the two glass sheets put thereon first before forming the resin spacer, the second stage having the two glass sheets transferred thereon next; providing the first stage with a first guide for guiding the two glass sheets in a horizontal direction parallel to a glass sheet surface, providing the second stage with a second guide for guiding the two glass sheets in the horizontal direction parallel to the glass sheet surface and, putting lower edge surfaces of the glass sheets on the first stage on the first guide, and putting the lower edge surfaces of the glass sheets on the second stage on the second guide; providing the first stage with a first holder in touch with faces of the two glass sheets that do not confront each other, providing the second stage with a second holder in touch with the faces of the two glass sheets that do not confront each other, and maintaining the certain gap before and/or during forming the resin spacer by supporting the two glass sheets on the first stage in substantially vertical fashion by the first holder and supporting the two glass sheets on the second stage in substantially vertical fashion by the second holder; carrying out horizontal movement of the relative movement by moving the two glass sheets in the horizontal direction parallel to the glass sheet surface between the first stage and the second stage; and carrying out vertical movement of the relative movement by moving the die in a vertical direction.

The present invention also provides a method for preparing a double glazing unit, which comprises supporting two glass sheets so as to maintain a certain gap therebetween, and injecting a resin material from a die to form a resin spacer in a peripheral edge between the two glass sheets while relatively moving the two glass sheets and the die so as to move the die along the peripheral edge between the two glass sheets, the die injecting the resin material in a certain sectional shape; characterized in that the method comprises providing the die between a first stage and a second stage, the first stage having the two glass sheets put thereon first before forming the resin spacer, the second stage having the two glass sheets transferred thereon next; making up the relative movement by movement (A) for reciprocating the two glass sheets in a horizontal direction parallel to a glass sheet surface between the first stage and the second stage, and movement (B) for moving the die in a vertical direction; supporting lower edge surfaces of the two glass sheets on the first stage and supporting the two glass sheets on the first stage in substantially vertical fashion while maintaining a certain gap between the two glass sheets by sucking at least vertical portions close to the second stage, the vertical portions located on faces of the two glass sheets that do not confront each other, supporting lower edge surfaces of the two glass sheets on the second stage and supporting the two glass sheets on the second stage in substantially vertical fashion while maintaining the certain gap between the two glass sheets by sucking at least vertical portions close to the first stage, the vertical portions located on the faces of the two glass sheets that do not confront each other, during the movement (A); and forming the spacer in horizontal edge portions of the peripheral edge between the glass sheets during movement between the first stage and the second stage by carrying out alternately the movement (A) and the movement (B) twice, and forming the spacer in vertical edge portions of the peripheral edge between the glass sheets to form the spacer throughout the peripheral edge between the two glass sheets by moving the die during halts of the two glass sheets on the first stage or the second stage.

The present invention also provides an apparatus for preparing a double glazing unit, which comprises a die for injecting a resin material in a certain sectional shape, and a moving device for relatively moving the die and two glass sheets so as to move the die along a peripheral edge between the two glass sheets while supporting the two glass sheets so as to maintain a certain gap therebetween, and wherein a resin spacer is formed in the peripheral edge between two glass sheets by carrying out the relative movement and injecting the resin material from the die; characterized in that the apparatus comprises a first stage and a second stage, the first stage having the two glass sheets put thereon first before forming the resin spacer, the second stage having the two glass sheets transferred thereon next, the die movably provided between the first stage and the second stage in a vertical direction; the moving device including a first guide provided on the first stage for supporting lower edge surfaces of the glass sheets and guiding the glass sheets in a horizontal direction parallel to a glass sheet surface, and a second guide provided on the second stage for supporting the lower edge surfaces of the glass sheets and guiding the glass sheets in the horizontal direction parallel to the glass sheet surface and, a first holder provided on the first stage and in touch with faces of the two glass sheets that do not confront each other, and a second holder provided on the second stage and in touch with the faces of the two glass sheets that do not confront each other; wherein the two glass sheets are moved in the horizontal direction parallel to the glass sheet surface between the first stage and the second stage to carry out horizontal movement of the relative movement while maintaining the certain gap before and/or during forming the resin spacer by supporting the two glass sheets on the first stage in substantially vertical fashion by the first holder and supporting the two glass sheets on the second stage in substantially vertical fashion by the second holder; and wherein the die is moved in the vertical direction to carry out vertical movement of the relative movement.

BEST MODE TO CARRY OUT THE INVENTION

Now, an apparatus for preparing a double glazing unit according to the present invention will be described in reference to the drawings.

Figure 1:
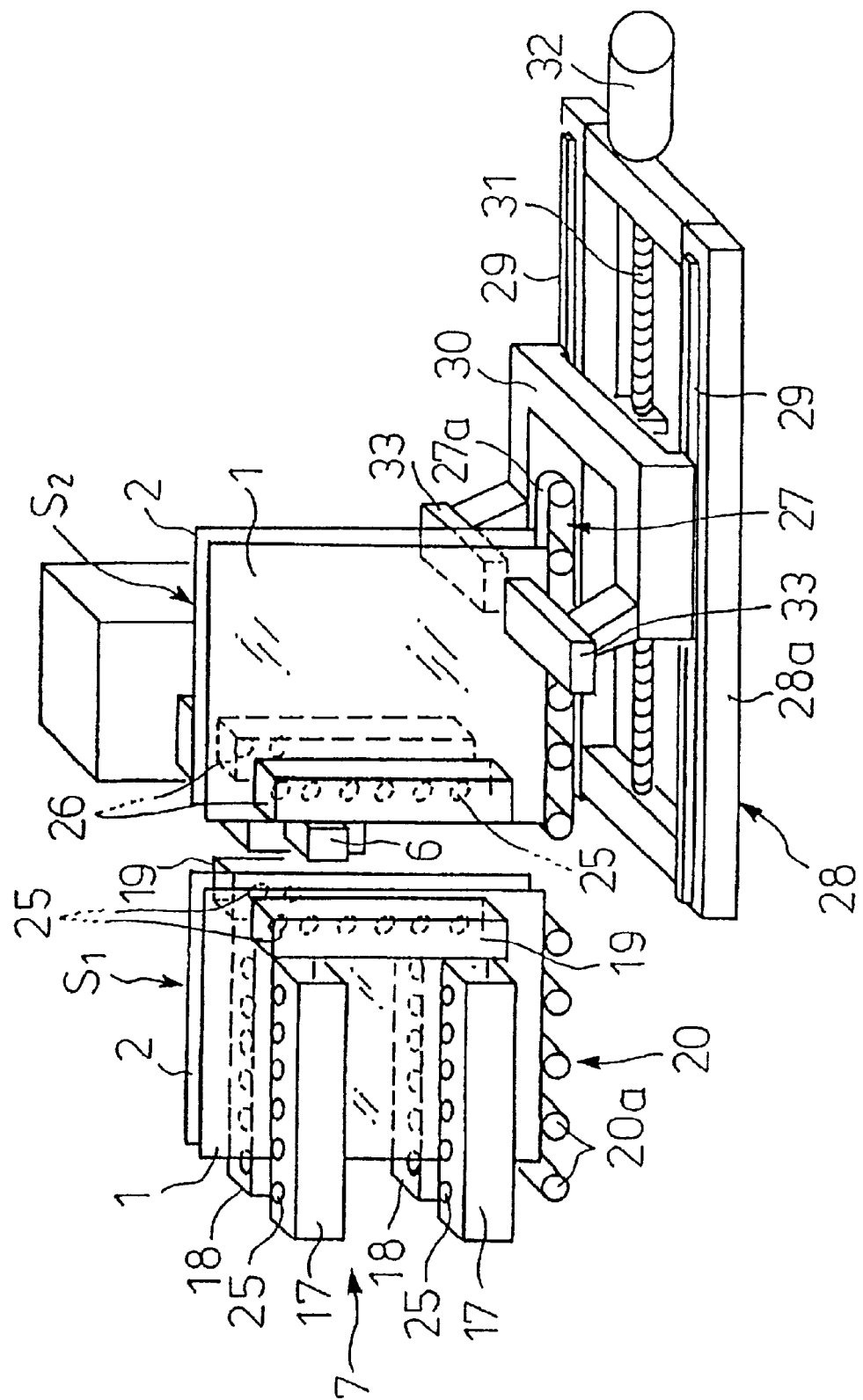
FIG. 1 is a perspective view showing an example of the entire apparatus for preparing a double glazing unit according to the present invention.

FIG. 1 is a perspective view of an example of the entire apparatus for preparing a double glazing unit according to the present invention. Suction boxes 17 and 17, which extend in a horizontal direction, are provided at an upper position and a lower position on a first stage $S_1$. Suction boxes, 18 and 18, which extend in the horizontal direction, are provided so as to confront the suction boxes 17 and 17, respectively. Suction boxes 19 and 19, which extend in a vertical direction, are spaced in symmetrical fashion on right ends of the suction boxes 17 and 18 in FIG. 1. The suction boxes 17, 18 and 19 form a part of a first holder 7. Under the suction boxes 18 and 19 are provided a plurality of conveyance rollers 20a, which can be reversely rotated by a drive (not shown), and which are horizontally spaced in a longitudinal direction of the suction boxes 17 and 18. The conveyance rollers 20a form a first guide 20. Between the symmetrically spaced suction boxes 17, 18 and 19, two glass sheets 1 and 2 are moved.

Figure 2:
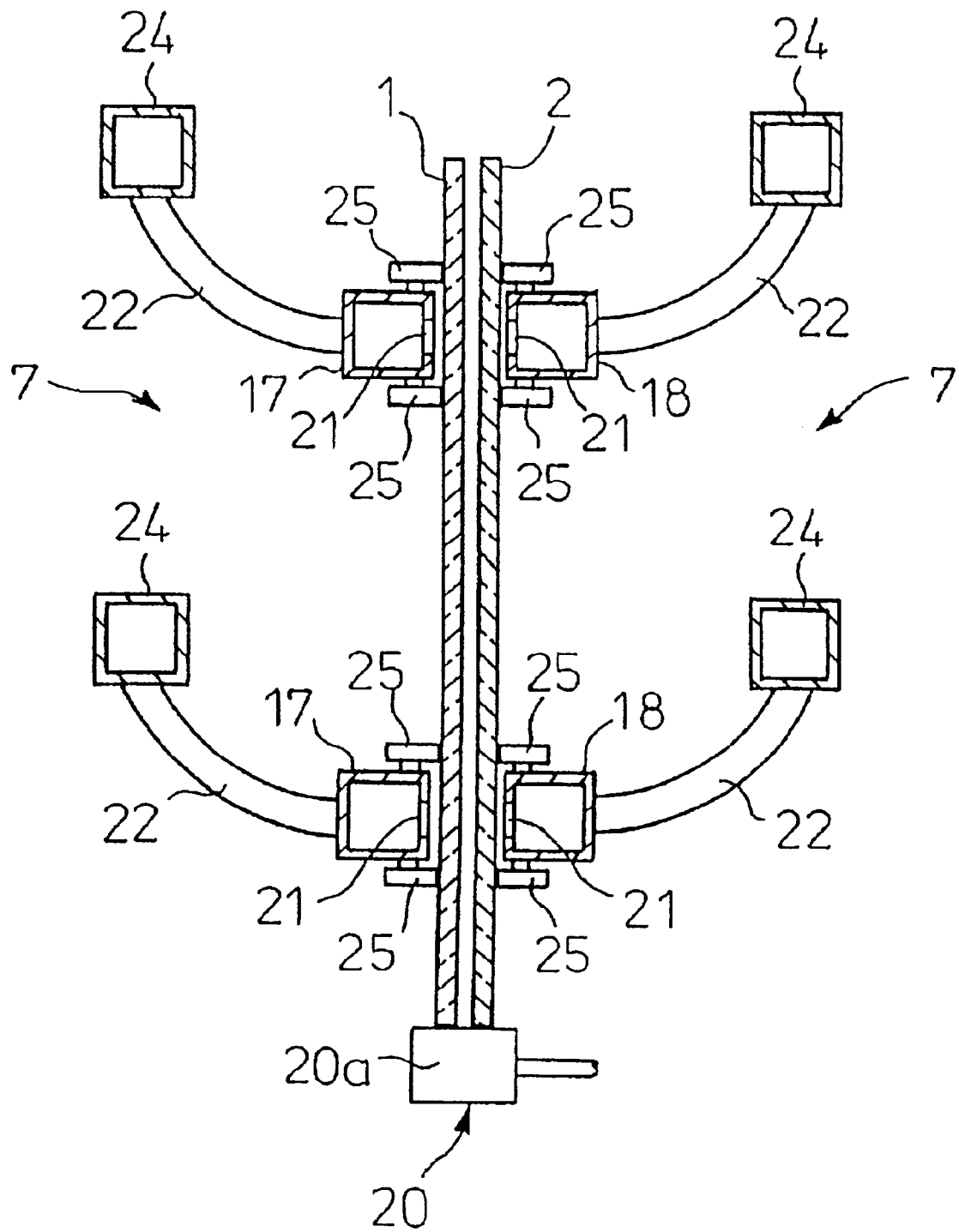
FIG. 2 is a vertical sectional side view showing an example of the glass sheets supporting state according to the present invention.
Figure 3:
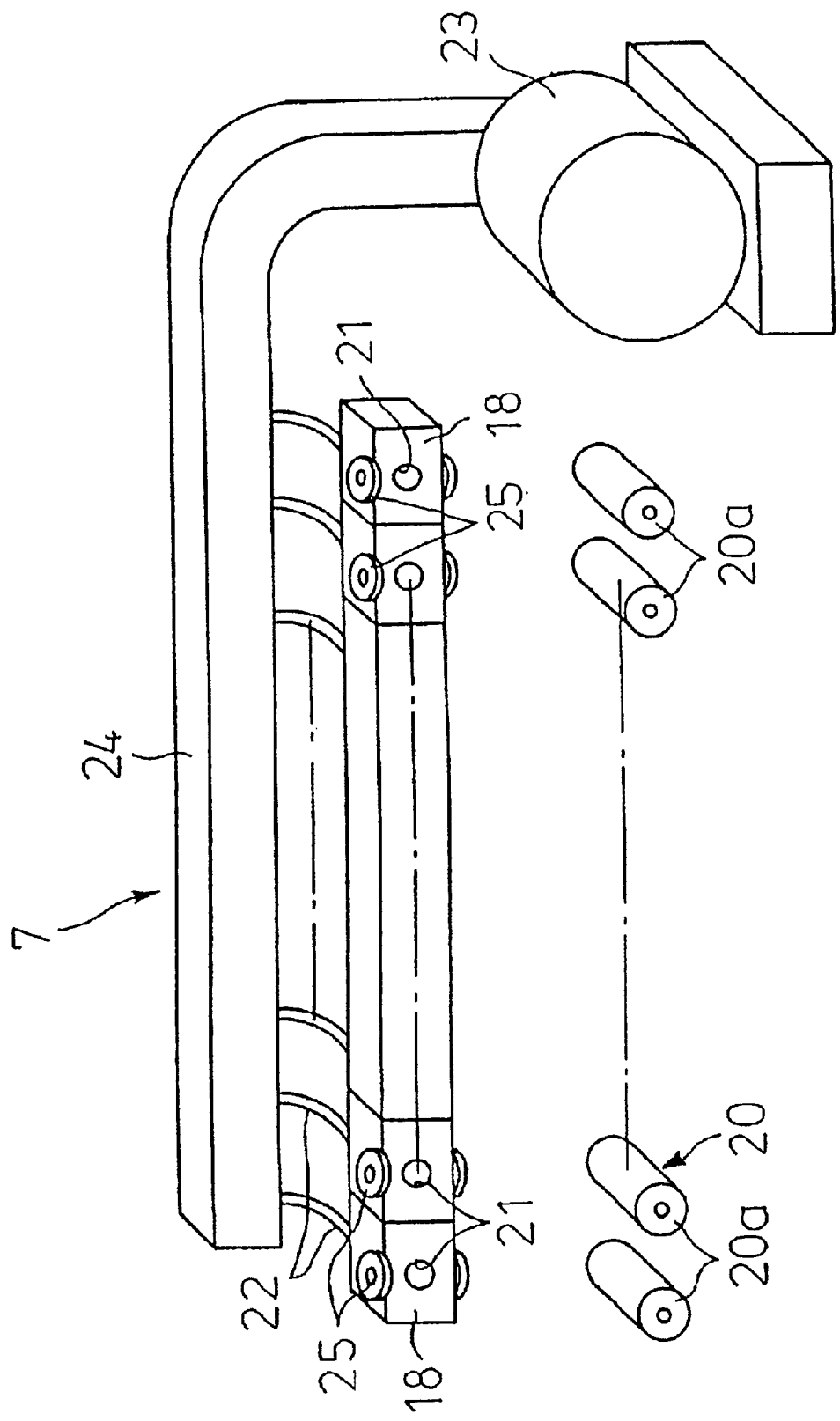
FIG. 3 is a perspective view of examples of the suction boxes and the guide according to the present invention.

FIG. 3 is a perspective view showing an example of a suction box 18 forming a part of the first holder 7 and an example of the first guide 20. The respective suction boxes 18 are divided into many compartments, which are lined in the longitudinal direction. The respective divided compartments have front sides formed with suction ports 21, which are open toward faces of the glass sheets 1 and 2 (see FIG. 2). The respective divided compartments have rear sides provided with narrow suction ducts 22. The respective suction ducts 22 are connected to a suction chamber 24, which is sucked by a suction fan 23.

The reason why the suction ducts 22 are narrow is that suction resistance is applied to the respective compartments divided in the suction boxes 18 to increase a pressure loss therein. When the suction ducts 22 are thick, the suction ducts may have restrictions provided therein.

The respective compartments of the suction boxes 18 have upper sides and lower sides provided with supporting rollers 25, which slightly project from the upper and lower sides of the suction boxes 18, and which are horizontally rotatable. The suction boxes 18 and the supporting rollers 25 form the first holder 7.

The suction boxes 17 are also provided with suction ports 21 facing the faces of the glass sheets 1 and 2, suction ducts 22, and supporting rollers 25 slightly projecting from sides of the suction boxes 17, forming the first holder 7 (see FIG. 2). The suction boxes 19 are also divided into many compartments, which are lined in the longitudinal direction. The respective divided compartments have front sides formed with suction ports, which are open toward the faces of the glass sheets 1 and 2. The respective divided compartments have suction resistance applied thereto, and the compartments are sucked by the suction fan. The suction boxes 19 are also provided with supporting rollers 25.

The suction boxes 17, 18 and 19 are fixed at certain positions on the first stage $S_1$.

Figure 15:
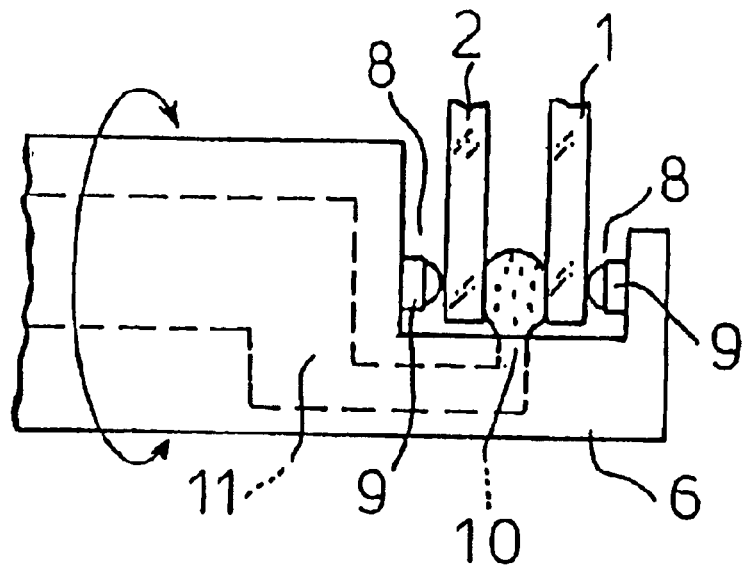
FIG. 15 is an enlarged side view of a die for injecting a resin material.
Figure 16:
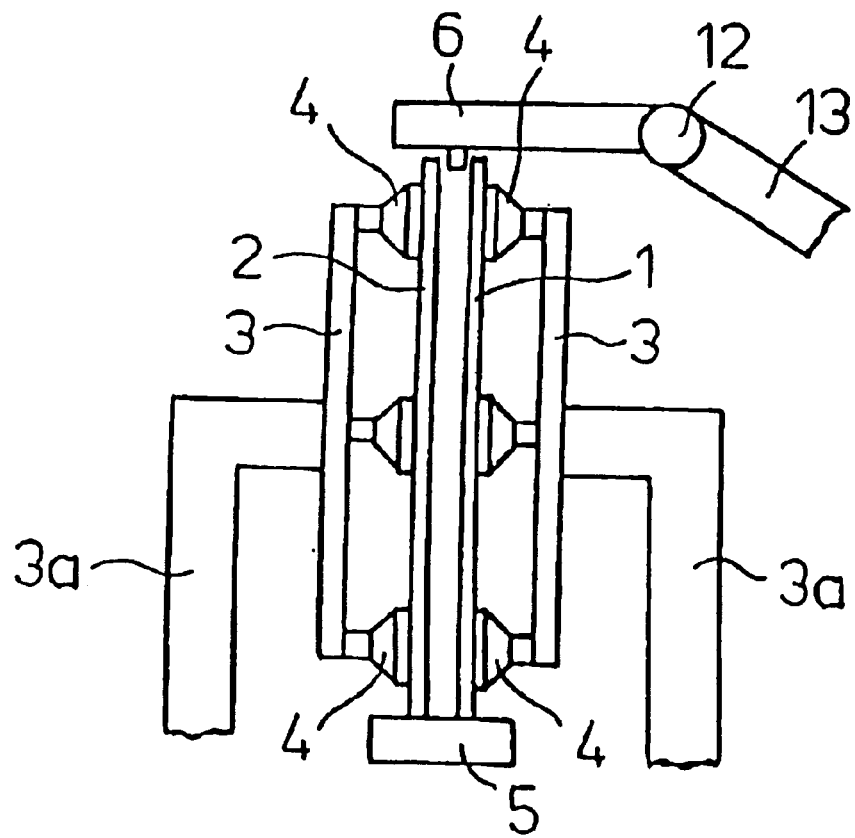
FIG. 16 is a side view showing an example of a conventionally proposed method for preparing a double glazing unit.
Figure 17:
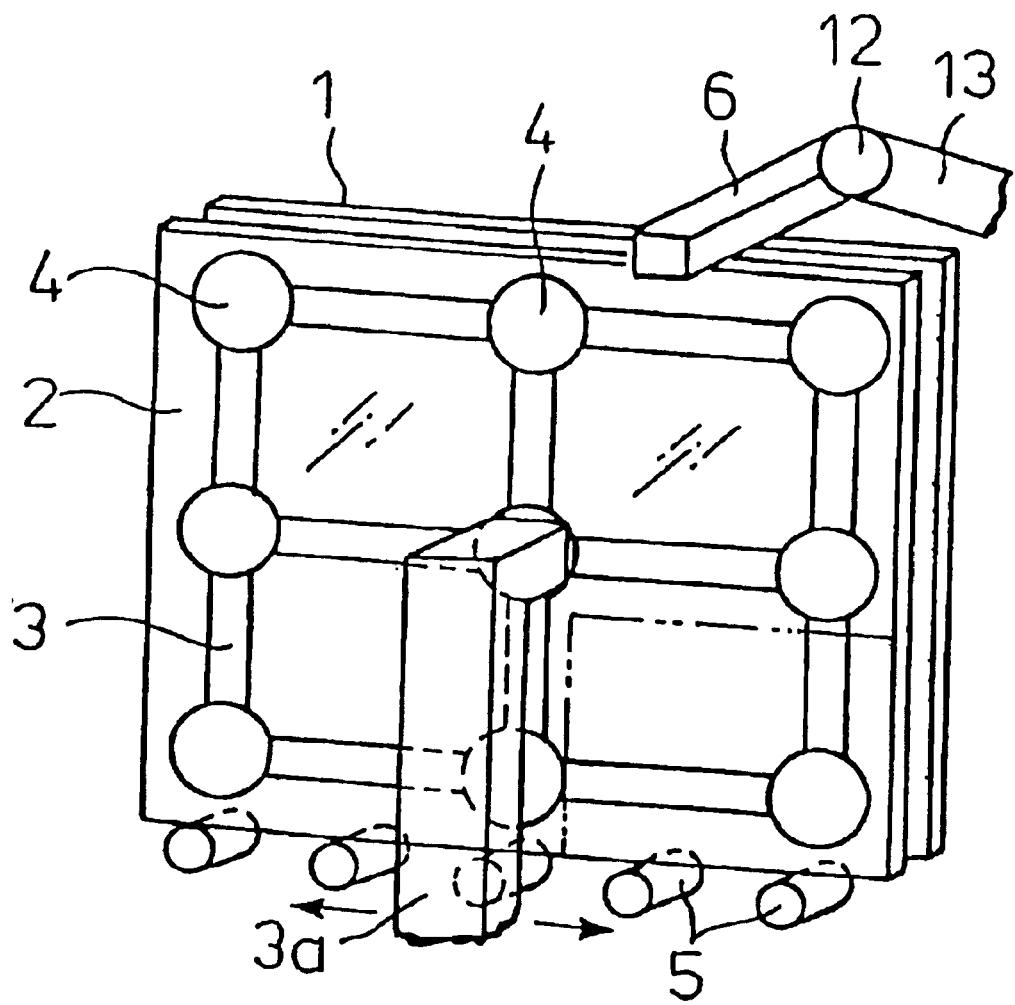
FIG. 17 is a front perspective view as viewed from an upper left position in FIG. 16.

On right sides of the suction boxes 19, the die 6 that is referred to with respect to FIG. 15 is located. The die 6 can move vertically along a linear rail (not shown). The die 6 can rotate at 90 deg. intervals. The die 6 injects a resin material supplied from an extruder in a certain shape.

On a second stage $S_2$ on a right side of the die 6 in FIG. 1, there are provided suction boxes 26 and 26, which confront the suction boxes 19 and 19 with the die 6 interposed, and which are elongated in the vertical direction. The suction boxes 26 are fixed at certain positions on the second stage $S_2$. The suction boxes 26 are divided into many compartments, which are lined in a longitudinal direction. The respective divided compartments have front sides formed with suction ports, which are open toward the faces of the glass sheets 1 and 2. The respective divided compartments have suction resistance applied thereto, and the compartments are sucked by the suction fan. The suction boxes 26 are also provided with supporting rollers 25.

At a position which extends from under the suction boxes 26 and 26 toward a right direction, there is horizontally provided a second guide 27, which includes a belt conveyor 27a. Under the belt conveyer 27a, there is provided a suction type pushing and pulling device 28. The second guide 27 includes an auxiliary drive. The auxiliary drive assists the conveyance operation of the suction type pushing and pulling device 28, which moves the glass sheets 1 and 2 on the second guide 27 by suction chucks 33. In this example, the second holder comprises the suction boxes 26 and 26 and the suction type pushing and puling device 28.

The suction type pushing and pulling device 28 includes a supporting frame 28a, which is elongated in right and left directions. The supporting frame 28a has an upper side provided with linear guides 29, which are elongated in the right and left directions. The linear guides 29 have a suction frame 30 in an angular U-character shape provided thereon so as to be movable along the linear guides 29. With the suction frame 30 is threadedly engaged a ball screw 31, which is elongated in the right and left directions. When the ball screw 31 is rotated in opposite directions by a servo motor 32, the suction frame 30 moves in the right and left directions along the linear guides 29. In this case, large parts of the liner guides 29 and a large part of the ball screw 31 are provided on the second stage $S_2$. By this arrangement, most of the movement of the suction frame 30 is carried out in the region of the second stage $S_2$. On the other hand, small parts of the linear guides 29 and a small part of the ball screw 31 extend in the first stage $S_1$. By this extension, the suction frame 30 can reach a position of the first stage $S_1$ close to the second stage $S_2$.

The suction frame 30 has an inner side sucked by a suction fan (not shown). The suction frame 30 has an upper left portion provided with the paired suction chucks 33, which communicate with the inner side of the suction frame 30, and which sandwich a lower portion of the glass sheets 1 and 2 on the belt conveyer 27a. The suction chucks 33 are provided so as to be movable under the suction boxes 19 and 26. The suction chucks 33 are formed with suction ports, which are directed to the faces of the glass sheets 1 and 2.

By this arrangement, the two glass sheets 1 and 2, which have lower edge surfaces carried on the first guide 20 and the second guide 27, can be moved in the horizontal direction parallel to a glass sheet surface between the first stage $S_1$ and the second stage $S_2$ by the suction type pushing and pulling device 28, while the glass sheets 1 and 2 are substantially vertically supported so as to have a certain gap maintained therebetween by the first holder 7. When the die 6 injects the resin material while the die 6 movable in the vertical direction and the two glass sheets 1 and 2 are relatively moved, the two glass sheets 1 and 2 have a spacer formed in a peripheral edge therebetween.

The glass sheets 1 and 2 can be moved by drive of the first guide 20 and the second guide 27. When the glass sheets 1 and 2 are moved between the first stage $S_1$ and the second stage $S_2$, the first guide 20 and the second guide 27 are driven, and the suction type pushing and pulling device 28 is driven to control the movement speed and the halt position of the glass sheets 1 and 2 by the suction type pushing and pulling device 28.

Figure 4:
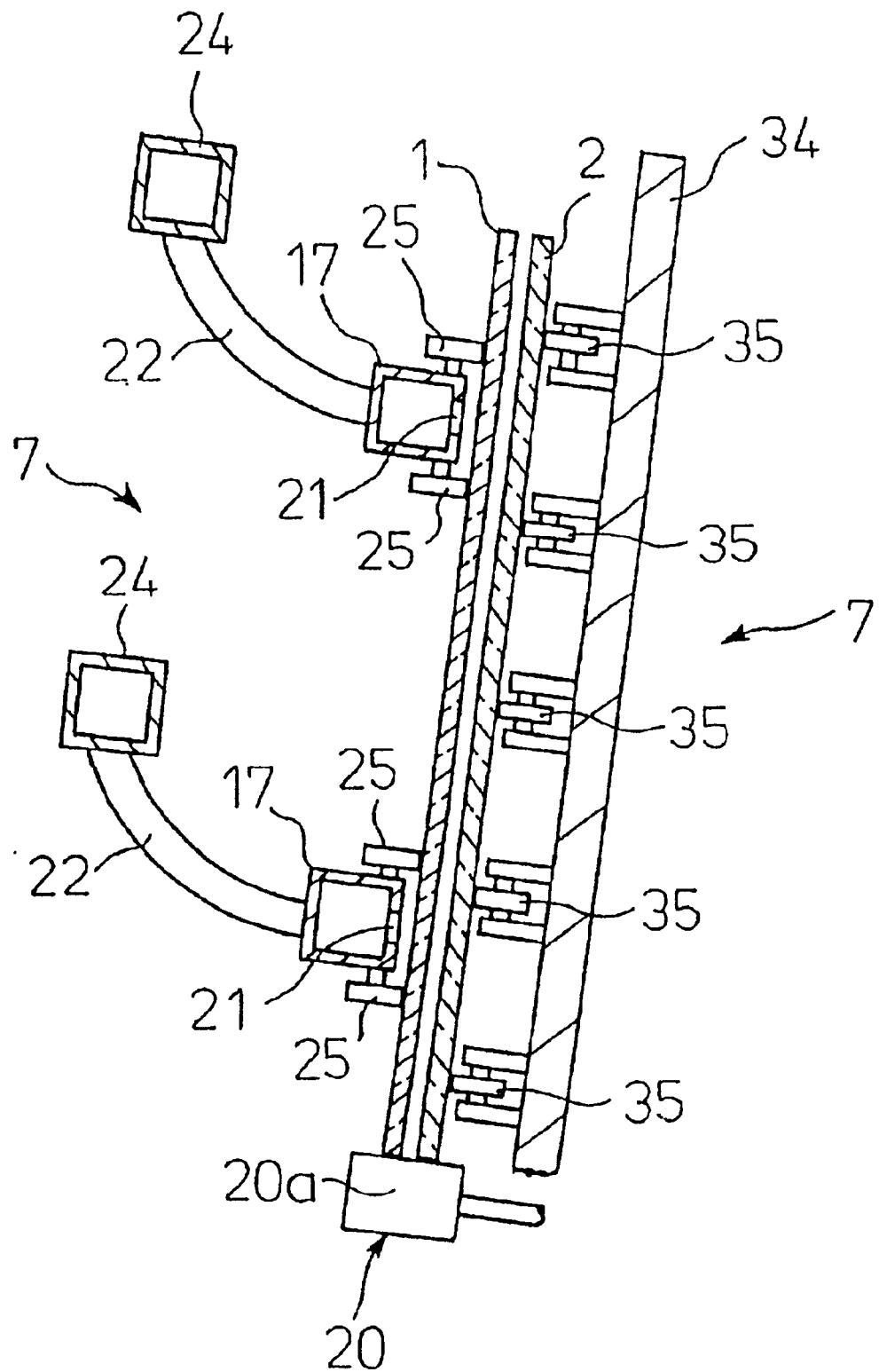
FIG. 4 is a vertical sectional side view showing another example of the glass sheets supporting state according to the present invention.

As another method for moving the glass sheets 1 and 2 in such a state that the glass sheets are parallel spaced with the certain gap, there is the following method. As shown in FIG. 4, the suction boxes 17 with the supporting rollers 25 are provided on the side of a glass sheet 1. A supporter 34, such as a supporting plate, which has many rotatable receiving rollers 35 provided side by side on an entire side thereof, is provided on the side of the other glass sheet 2. The other glass sheet 2, which is carried on the conveyance rollers 20a, is leaned against the receiving rollers 35. In this case, the supporter 34 has an upper side inclined toward the right side in FIG. 4 to prevent the glass sheet 2 supported by the receiving rollers 35 from falling toward the glass sheet 1. The positions of the suction boxes 17 for supporting the glass sheet 1 are adjusted so as to incline the glass sheet 1 at the same angle to bring the two glass sheets 1 and 2 into parallel fashion. The inclining angle is about 5–10 deg.

Now, a method for preparing a double glazing unit will be described by use of the apparatus shown in FIG. 1–FIG. 4.

Figure 5:
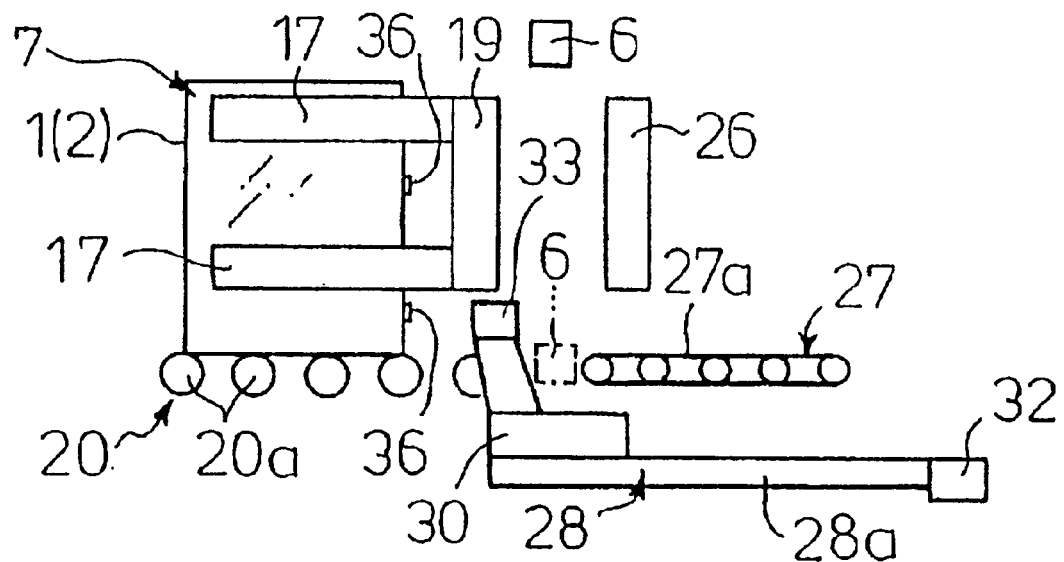
FIG. 5 is a front view showing an example of a step in the present invention.

As shown in FIG. 1 and FIG. 5, the two glass sheets 1 and 2 are carried on the conveyance rollers 20a to be introduced between the suction boxes 17 and 18, which are spaced each other and elongated in the horizontal direction. Among the two glass sheets 1 and 2 introduced between the suction boxes 17 and 18, one of the glass sheets 1 is sucked by the suction boxes 17 on the left side in FIG. 1 and is brought into contact with the supporting rollers 25 on the left side, thus being vertically supported. Among the two glass sheets 1 and 2 introduced between the suction boxes 17 and 18, the other glass sheet 2 is sucked by the suction boxes 18 on the right side in FIG. 1 and are brought into contact with the supporting rollers 25 on the right side, thus being vertically supported. The two glass sheets 1 and 2 are moved in the right direction in FIG. 5 by rotation of the conveyance rollers 20a, having the certain gap maintained therebetween with accuracy and parallel fashion held therebetween by the supporting rollers 25 and being guided by the supporting rollers 25.

Compartments confronting the face of the glass sheet 1 or 2 and compartments not confronting the face coexist at the suction boxes 17 and 18 from time to time. The narrow suction ducts 22 or the restrictions provide the respective divided compartments with the suction resistance to increase the pressure loss therein. This arrangement eliminates the danger of sucking air only through the suction ports 21 of the suction boxes 17 and 18 that do not confront the face of the glass sheet 1 or 2. Air is almost evenly sucked through all suction ports 21 of the suction boxes 17 and 18. Thus, the glass sheets 1 and 2 are brought into contact with the supporting rollers 25, being reliably sucked by suction boxes 17 and 18.

Into a path for the glass sheets 1 and 2, which move on the conveyance rollers 20a in the right direction in FIG. 5 in such a state that both sheets are spaced in parallel, projectable stoppers 36 shown in FIG. 5 are projected. The projected stoppers 36 can make the right vertical edges of the two glass sheets 1 and 2 flush with each other. After the right vertical edges of the two glass sheets 1 and 2 have been flush with each other, the stoppers 36 retract. When the stoppers have retracted, the two glass sheets 1 and 2, which have had the right vertical edges flushed each other, are moved to a certain position in the right direction in FIG. 5 by rotation of the conveyance rollers 20a.

Figure 6:
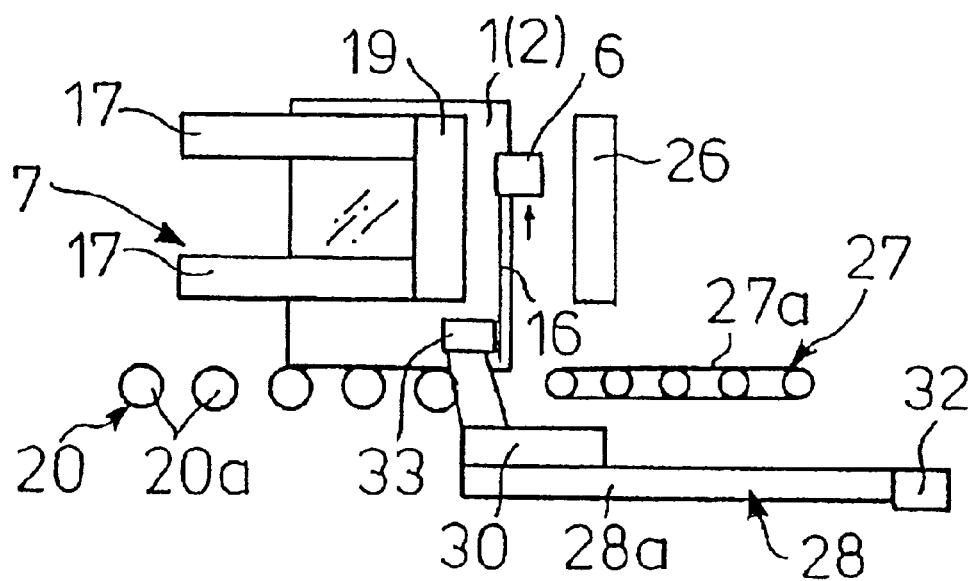
FIG. 6 is a front view showing an example of a step in the present invention.

At that time, the servo motor 32 for the suction type pushing and pulling device 28 is activated to move the suction frame 30 to a left portion of the supporting frame 28a as shown in FIG. 5. The glass sheet 1 and 2 thus moved have corners at lower right ends sucked by the sucking chucks 33 (FIG. 6). The die 6 that was located at the position indicated by a solid line in FIG. 5 is located at a position indicated by a dotted line. The die 6, which has lowered to the position indicated by the dotted line, rotates so that its resin discharge port 10 is directed to the right vertical edges of the glass sheets 1 and 2. On the other hand, the servo motor 32 is activated to halt the right vertical edges of the glass sheets 1 and 2 along the vertical line of the die 6 with good accuracy. After that, the resin material 16 is discharged from the resin discharge port 10 (see FIG. 15). When the die moves upwardly discharging the resin material (see FIG. 6), the resin material 16 is injected between the right vertical edges of the glass sheets 1 and 2. When the stoppers 36 can locate the glass sheets at the halt position with good accuracy, the positional adjustment of the glass sheets 1 and 2 by the suction type pushing and pulling device 28 may be eliminated.

When the die 6 has risen to top ends of the right vertical edges of the glass sheets 1 and 2, the die stops rising. When the die 6 has reached the top ends of the right vertical edges of the glass sheets 1 and 2, the die 6 counterclockwise rotates by 90 deg. to direct the resin discharge port 10 toward upper edges of the glass sheet 1 and 2.

Figure 7:
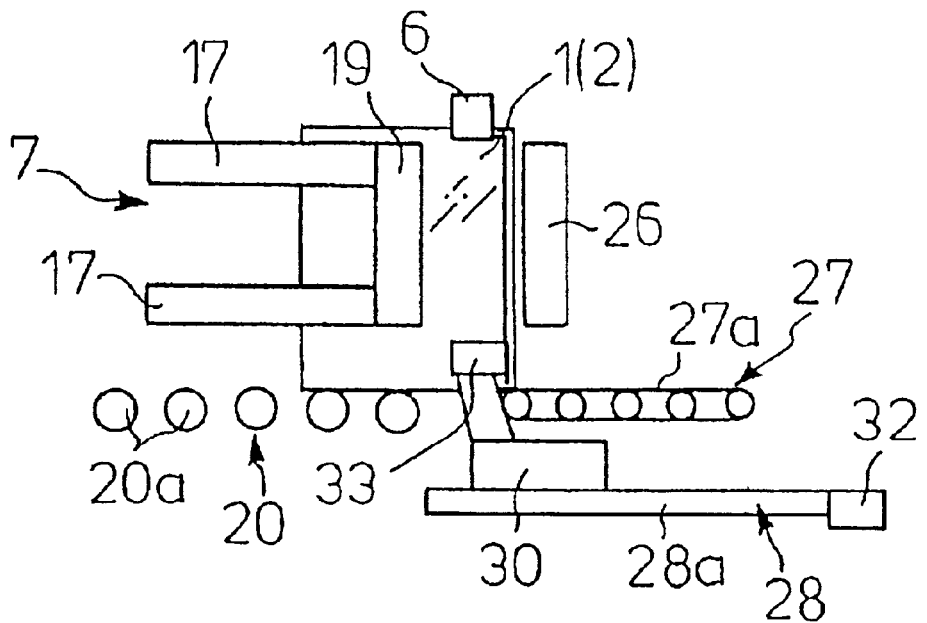
FIG. 7 is a front view showing an example of a step in the present invention.

Subsequently, when the conveyance rollers 20a are driven, and when the servo motor 32 is activated to move the suction frame 30 at a certain speed to a right portion of the supporting frame 28a, the glass sheets 1 and 2 move in the right direction. As shown in FIG. 7, the die 6 injects the resin material 16 between the upper edges of the glass sheets 1 and 2. At that time, the glass sheets 1 and 2 are transferred from the conveyance rollers 20a onto the belt conveyor 27a auxiliarily driven. In the movement of the glass sheets 1 and 2, the driving forces of the conveyance rollers 20a and the belt conveyor 27a play roles to assist the movement. The moving speed of the glass sheet 1 and 2 is controlled by the suction chucks 33 driven by the servo motor 32 in the suction type pushing and pulling device 28.

Figure 8:
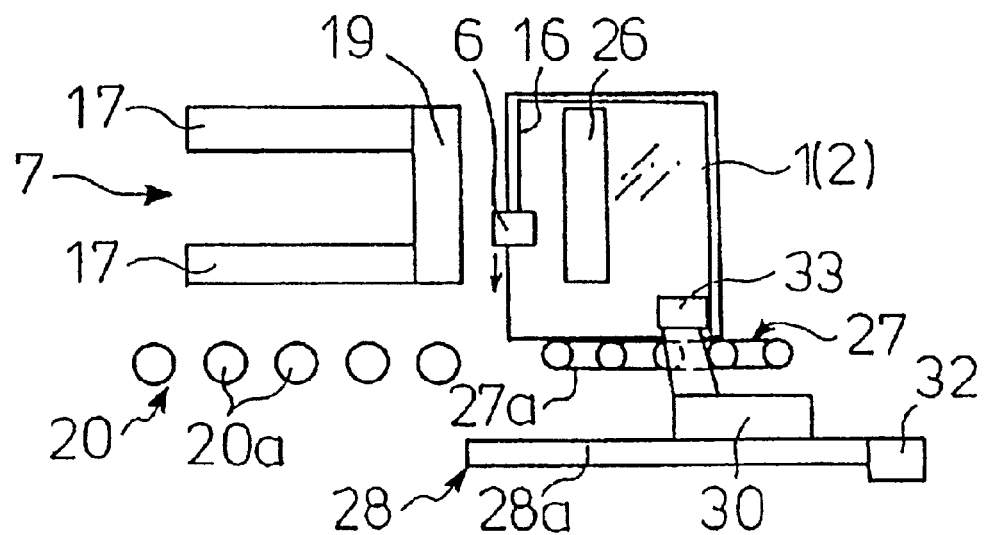
FIG. 8 is a front view showing an example of a step in the present invention.

When the die 6 has reached left ends of the upper edges of the glass sheets 1 and 2 in FIG. 7, the conveyance rollers 20a and the belt conveyor 27a stop the operation, and the servo motor 32 also stops the operation. In this manner, the left vertical edges of the glass sheets 1 and 2 halt along the vertical line of the die 6 with good accuracy. Subsequently, the die 6 counterclockwise rotates by 90 deg. so that the resin discharge port 10 shown in FIG. 15 is directed toward the left vertical edges of the glass sheets 1 and 2. When the die 6 lowers discharging the resin material from the resin discharge port 10, the resin material 16 is injected between the left vertical edges of the glass sheets 1 and 2 as shown in FIG. 8. At that time, the suction boxes 26, which are elongated in the vertical direction, suck the faces of the two glass sheets 1 and 2 to maintain the gap between the right vertical edges of the two glass sheets 1 and 2 at the certain value.

Figure 9:
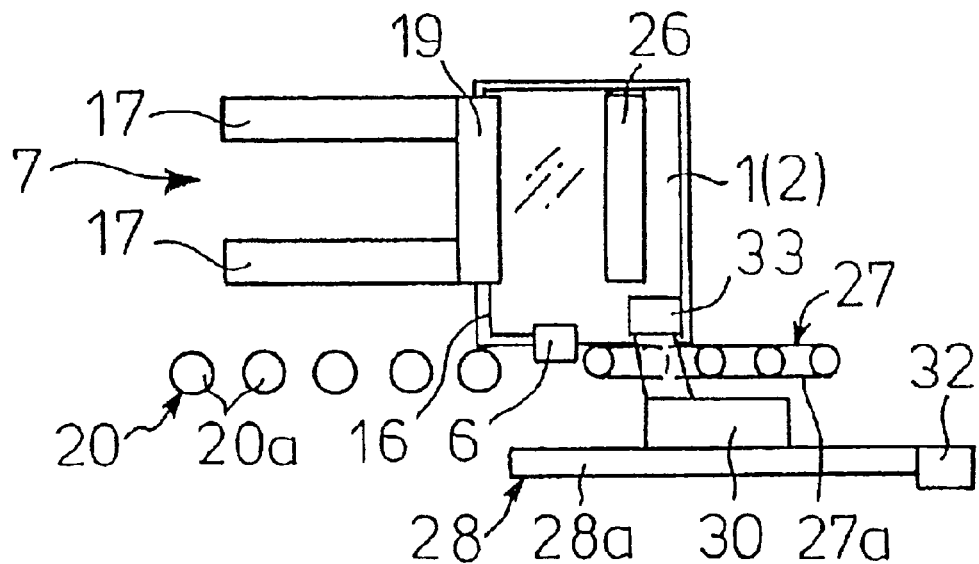
FIG. 9 is a front view showing an example of a step in the present invention.

When the die 6 has lowered to the lower edges of the glass sheets 1 and 2, the die 6 stops lowering, and the die 6 counterclockwise rotates by 90 deg. Additionally, the conveyance rollers 20a rotate reversely, and the servo motor 32 is activated to move the suction frame 30 at the certain speed toward the left portion of the supporting frame 28a. As a result, the glass sheets 1 and 2 are transferred from the belt conveyor 27a onto the conveyance rollers 20a, and the die 6 injects the resin material 16 between the lower edges of the glass sheets 1 and 2 as shown in FIG. 9.

Figure 10:
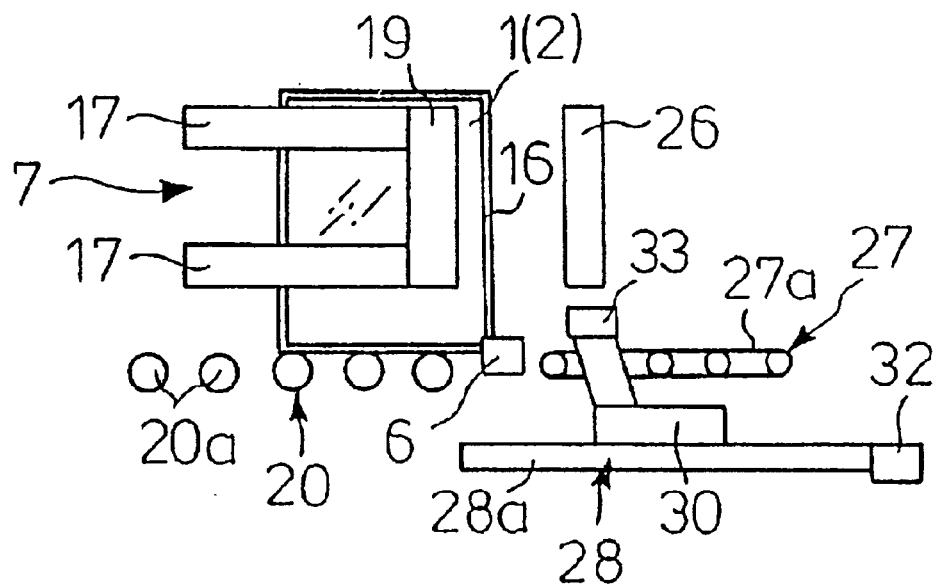
FIG. 10 is a front view showing an example of a step in the present invention.

When the glass sheets 1 and 2 have completed the transfer onto the conveyance rollers 20a, and when the die 6 has reached the right vertical edges of the glass sheets 1 and 2, the conveyance rollers 20a and the servo motor 32 stop the operation. After the suction chucks 33 have released the suction, the servo motor 32 is activated to move the suction frame 30 to the right portion of the supporting frame 28a, retracting the suction chucks 33 as shown in FIG. 10. Thus, the two glass sheets 1 and 2, which have the certain gap maintained therebetween, have the resin material 16 continuously injected between the entire peripheral edges without interference between the suction chucks 33 and the die 6, and the production of the double glazing unit is completed. In this manner, the double glazing unit is produced so as to have the spacer formed with a single connection.

Figure 11:
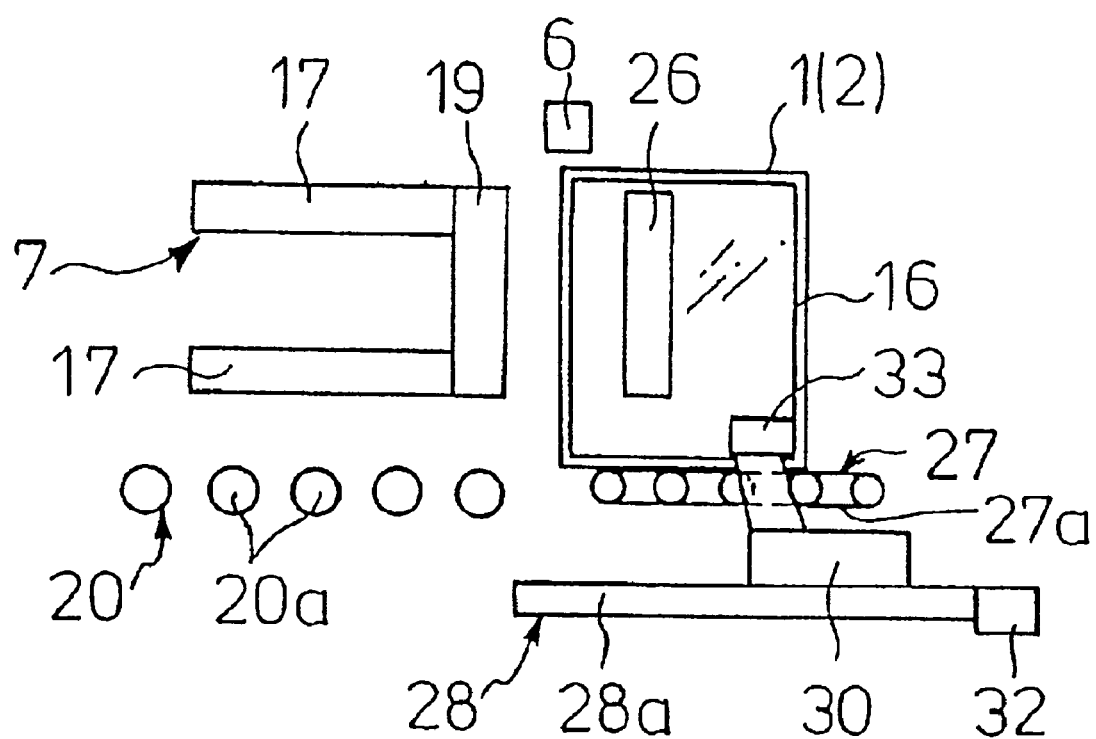
FIG. 11 is a front view showing an example of a step in the present invention.

When the production of the double glazing unit is completed, the die 6 rises and returns to the state shown in FIG. 5. The double glazing unit thus produced is carried out in the right direction in FIG. 11 by the operations of the conveyance rollers 20a and the belt conveyor 27a as shown in FIG. 11.

Figure 12:
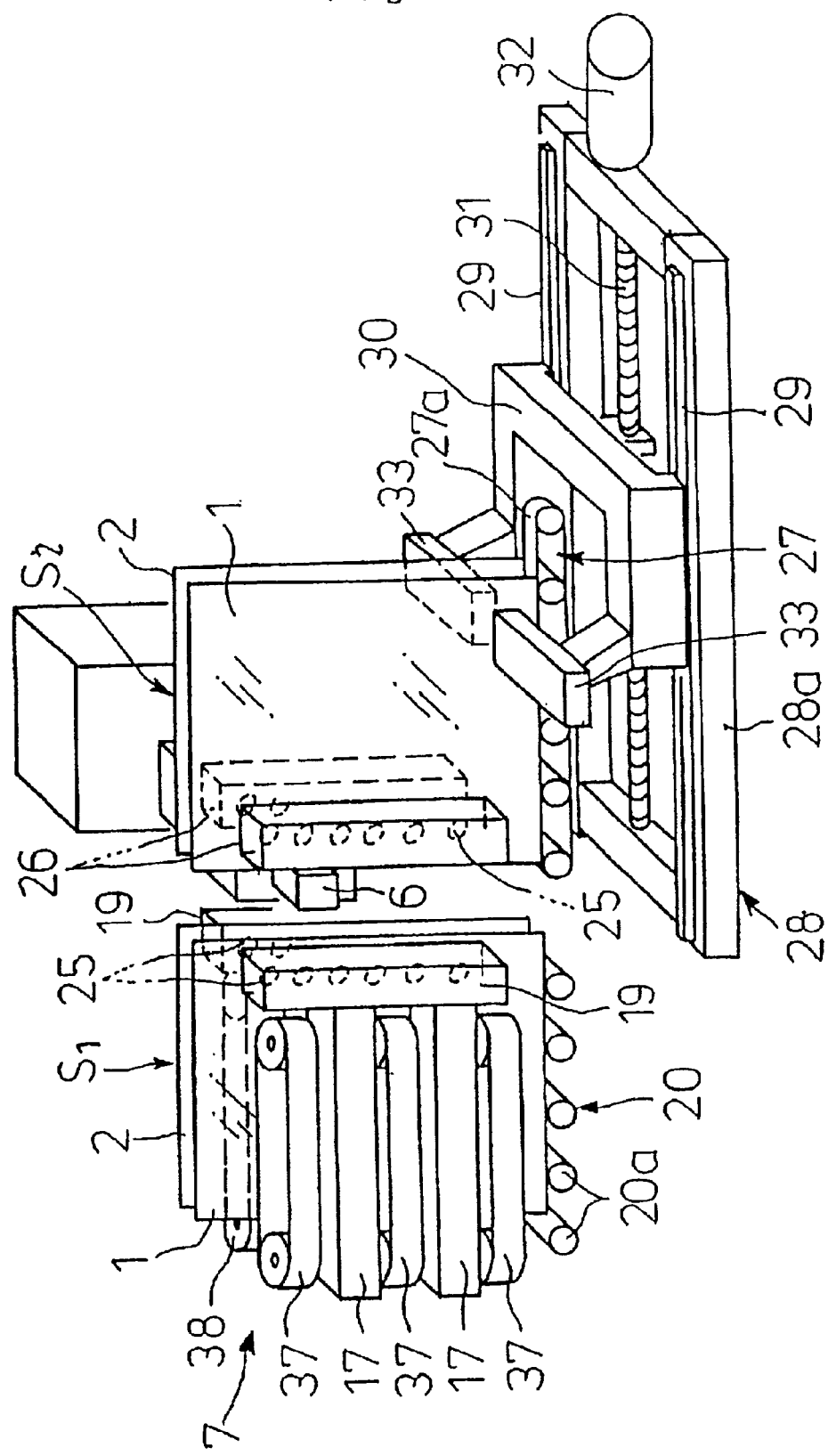
FIG. 12 is a perspective view showing another example of the entire apparatus for preparing a double glazing unit according to the present invention.
Figure 13:
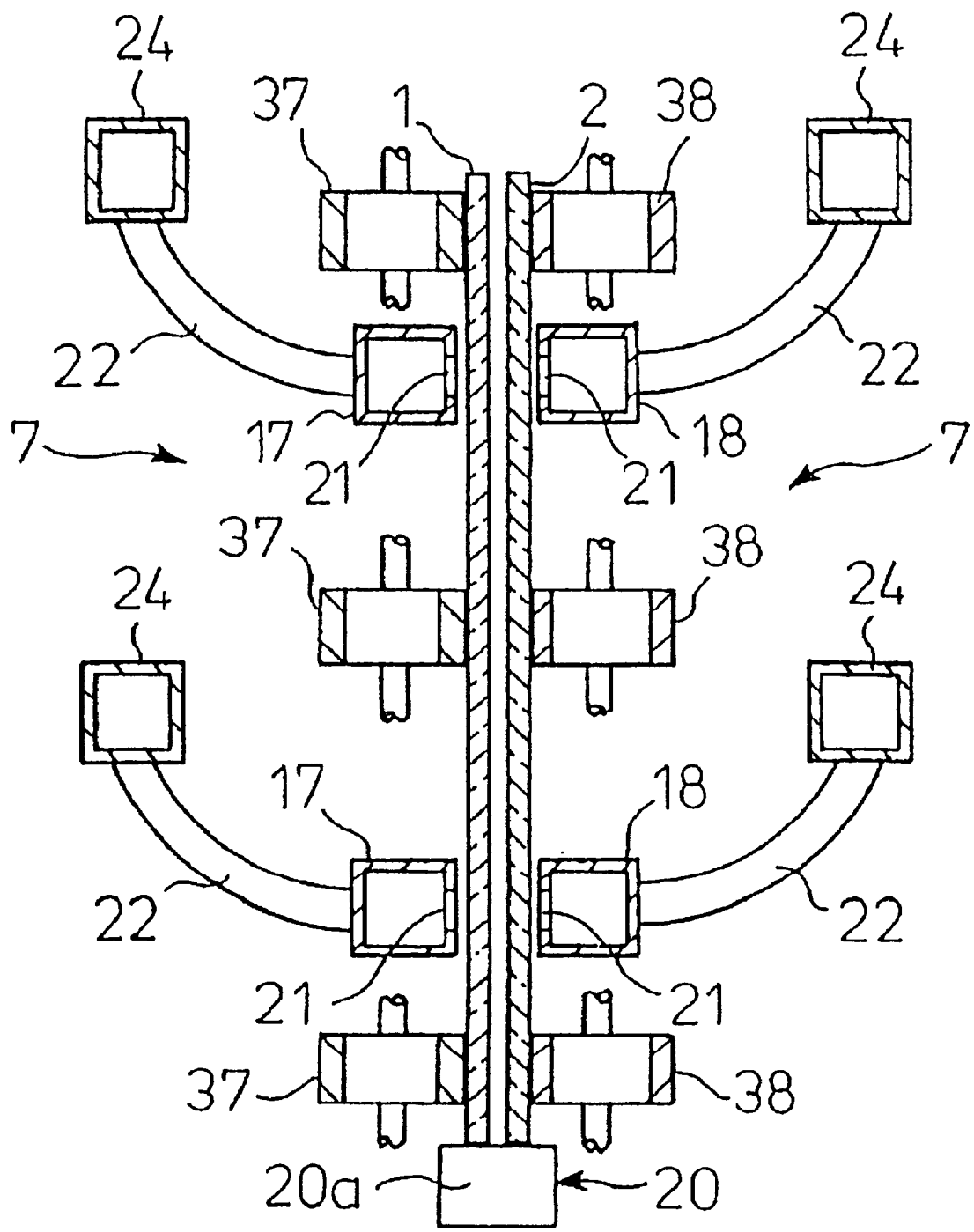
FIG. 13 is a vertical sectional side view showing another example of the glass sheets supporting state according to the present invention.

FIG. 12 is a perspective view of the apparatus having another example of the supporting state for the glass sheets, and FIG. 13 is a vertical sectional view showing the supporting state shown in FIG. 12. The apparatus shown in FIG. 12 and FIG. 13, and the apparatus shown in FIG. 1 and FIG. 2 are different as follows. In the apparatus shown in FIG. 12 and FIG. 13, there are confronted belt conveyors 37 and 38, which are elongated in the horizontal direction so as to get in contact with the faces of the glass sheets 1 and 2 opposite to the confronted faces. The belt conveyors 37 and 38 are provided in three stages in the vertical direction. Between adjacent belt conveyors 37 (38), there is a suction box 17 (18) as in the example shown in FIG. 1. The suction boxes 17 and 18 are located to have slight gaps to the respective faces of the glass sheets 1 and 2 opposite to the confronted faces.

In the apparatus shown in FIG. 12 and FIG. 13, the belt conveyors 37 and 38 and the suction boxes 17 and 18 form the first holder 7. The apparatus shown in FIG. 12 and FIG. 13 includes no supporting rollers 25, which are provided on the suction boxes 17 and 18 in the apparatus shown in FIG. 1 and FIG. 2.

As the material for the belt conveyors 37 and 38, a material wherein a foamed resin having independent pores is affixed to a surface of an inextensible substrate, such as a wired iron rubber, may be used. The foamed pores in the surface perform the suction function.

Figure 14:
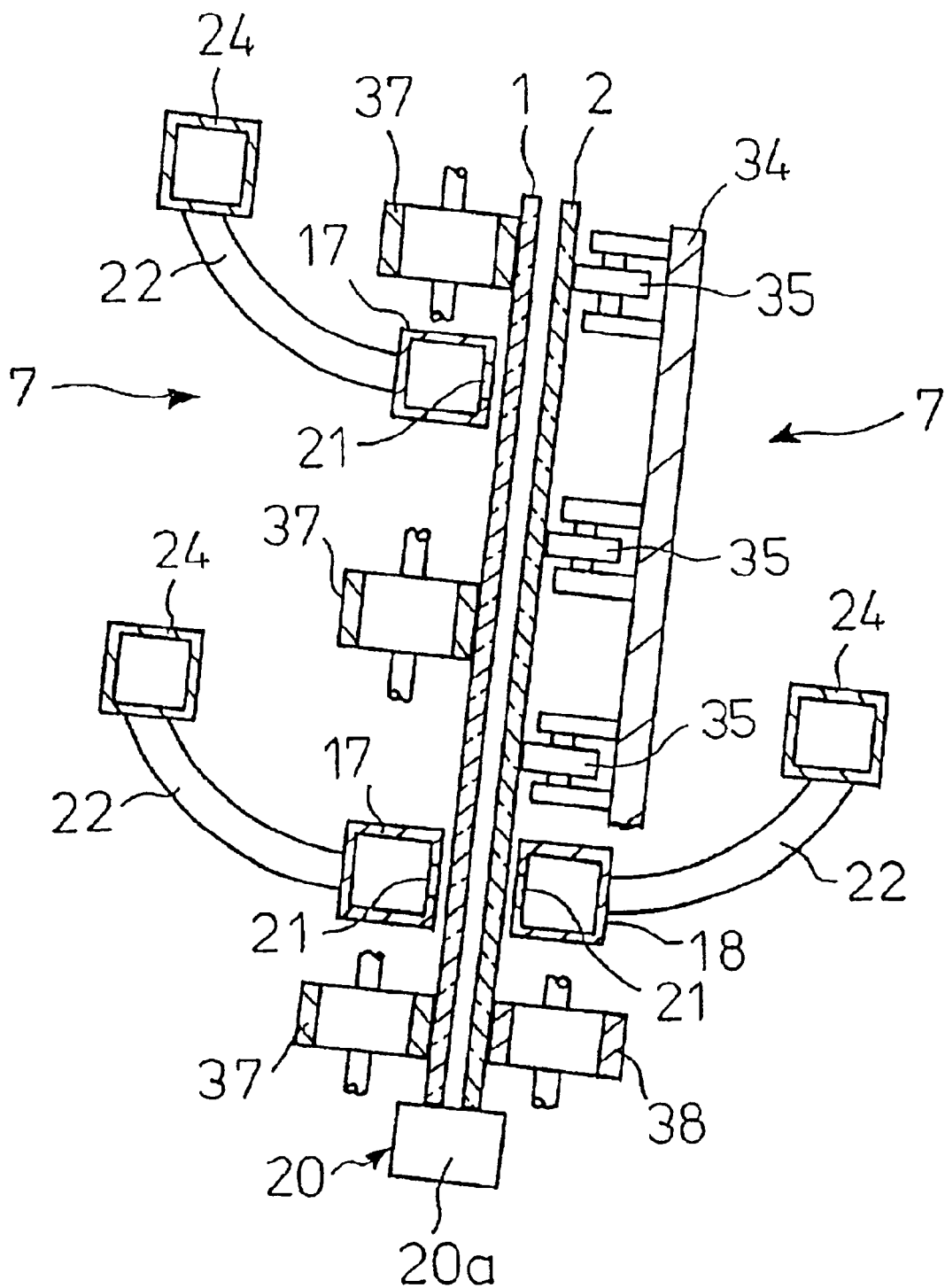
FIG. 14 is a vertical sectional side view showing another example of the glass sheets supporting state according to the present invention.

FIG. 14 shows another method for moving the glass sheets 1 and 2 in such a state that the glass sheets are parallel spaced with the certain gap. In the method shown in FIG. 14, the belt conveyors 37 and the suction boxes 17 are provided only on the side of one of the glass sheets 1. On the side of the other glass sheet 2, there is provided a supporter 34, such as a supporting plate, which has many rotatable receiving rollers 35 provided side by side on an entire side thereof. The other glass sheet 2, which is carried on the conveyance rollers 20a, is leaned against the receiving rollers 35. In this case, the supporter 34 has an upper side inclined toward the right side in FIG. 13 to prevent the glass sheet 2 supported by the receiving rollers 35 from falling toward the glass sheet 1. The positions of the suction boxes 17 for supporting the glass sheet 1 are adjusted so as to incline the glass sheet 1 at the same angle to bring the two glass sheet 1 and 2 into parallel fashion. The inclining angle is about 5–10 deg. In the apparatus shown in FIG. 14, the belt conveyors 37, the suction boxes 17 and the supporter 34 with the receiving rollers 35 form the first holder 7.

When a double glazing unit is produced by use of the apparatus shown in FIG. 12 through FIG. 14, the production can be carried out by the same method as that shown FIG. 5 through FIG. 11.

The present invention is not limited to the arrangements in the respective embodiments, and variations and modifications are possible without departing the sprit of the invention.

Each of the embodiments is a case wherein the first stage $S_1$ includes the first supporter 7 comprising the suction boxes 17 and 18 with the supporting rollers 25 (FIG. 1), the first supporter 7 configured to receive the other glass sheet 2 in an inclined state by the receiving rollers 35 (FIG. 4), the first supporter 7 comprising the belt conveyors 37 and 38 and the suction boxes 17 and 18 (FIG. 12), or the first supporter 7 configured to have the receiving rollers 35 so as to receive the other glass sheet 2 in an inclined state (FIG. 14). The second supporter, which is provided on the second stage $S_2$, may be formed in the same structure as any one of these first supporters 7.

The first guide 20 and the second guide 27 for the glass sheets 1 and 2 may comprise a conveyor system as in the conveyance rollers 20a or the belt conveyor 27a, or a combination thereof. The movement and the positioning of the glass sheets 1 and 2 between the first stage $S_1$ and the second stage $S_2$ may be carried out only by a conveyance system, such as the conveyance rollers 20a or the belt conveyor 27a. The glass sheets 1 and 2 may be moved by pushing the rear end surfaces of the glass sheets 1 and 2 in an advance direction between the first stage $S_1$ and the second stage $S_2$.

When the movement and the positioning of the glass sheets 1 and 2 are carried out only by the conveyor system, such as the conveyance rollers 20a or the belt conveyor 27a, it is difficult to maintain the positioning accuracy between the glass sheets 1 and 2 due to the presence of slippage caused between the glass sheets 1 and 2 and the conveyance system in some cases. When the positioning accuracy can not be maintained, it is impossible to form a spacer in stable fashion because of misalignment in the positional relationship with the die 6.

From this viewpoint, it is preferable that the moving speed and the halt position of the glass sheets 1 and 2 are controlled by the suction type pushing and puling device 28 while the glass sheets 1 and 2 are moved by the driving forces of the conveyance rollers 20a and the belt conveyor 27a. In this preferred case, the glass sheets 1 and 2 sucked by the suction chucks 33 are moved with a set speed and halted at a set position with good accuracy since the suction type pushing and pulling device 28 moves the suction chucks 33 along with the suction frame 30 by the ball screw 31 driven by the servo motor 32. Thus, the glass sheets 1 and 2 can have the spacer formed in a peripheral edge therebetween in stable fashion.

In this case, the first and second guides serve the function of moving the glass sheets, the first and second holders except for the suction type pushing and pulling device serve the function of maintaining the gap between the glass sheets, and the suction type pushing and pulling device serves the function of controlling the moving speed and the halt position of the glass sheets. Since the respective devices share the operations, the structure of the apparatus can be simplified, the positional control and other controls of the glass sheets can be reliably carried out with good accuracy by the respective devices in comparison with the conventional method wherein a single device simultaneously serves functions of maintaining the gap between the glass sheets and moving the glass sheets.

When the suction type pushing and pulling device is used, it is preferable that the suction type pushing and pulling device sucks and holds portions of the lower edges of the two glass sheets close to the second stage. The reasons are as follows: The mechanism for moving the suction type pushing and pulling device can be prevented from interfering with the die by having the lower edges of the glass sheets sucked and held. The reciprocation of the two glass sheets between the first stage and the second stage can be simplified by having the lower edge portions of the glass sheets close to the second stage sucked and held.

The order wherein the resin material is injected in the peripheral edge between the glass sheets 1 and 2 is not limited to the order shown in FIG. 5–FIG. 11, and the injection may be carried out in various types of order. As in the examples, the resin spacer is preferably formed in a vertical edge between the glass sheets 1 and 2 first since the gap between the glass sheets 1 and 2 can be maintained in stable fashion. In other words, the use of the holders or the suction type pushing and pulling device according to the present invention contributes to maintain the gap between the glass sheets 1 and 2 in stable fashion. In comparing the movement of the glass sheets 1 and 2 to the movement of the die 6, the gap between the glass sheets 1 and 2 is more stable during the movement of the die 6. When the glass sheets 1 and 2 have the spacer formed in any one of the edges, the gap maintain capacity between the glass sheets 1 and 2 is improved.

From this viewpoint, the movement of the die 6 is carried out first since the gap between the glass sheets 1 and 2 is more stable in this movement. Thus, the spacer is provided in a part of the edges between the glass sheets 1 and 2 during the movement of the glass sheets 1 and 2 wherein the maintaining of the gap is slightly less stable than the movement of the die 6. For the reasons, it is preferable that the resin spacer is formed in a vertical edge between the glass sheets 1 and 2 first.

The sucked positions on the faces of two glass sheets opposite to the confronted faces for maintaining the space between the two glass sheets may be appropriately determined. In the embodiments, the suction boxes 17 suck and hold a plurality of horizontal portions on the glass sheets, and the suction boxes 19 suck and hold vertical portions on the glass sheets in the first stage. The suction boxes 26 suck and hold vertical portions on the glass sheets in the second stage. As another embodiment, the glass sheets may have the entire faces sucked and held, or the glass sheets may have a plurality of vertical portions sucked and held.

In order to maintain a gap between two glass sheets, it is preferable that the glass sheets on the first stage have at least vertical portions close to the second stage sucked, and that the glass sheets on the second stage have at least vertical portions close to the first stage sucked. The reasons are as follows.

It is preferable that the relative movement between the glass sheets and the die comprises horizontal movement of the glass sheets and vertical movement of the die. This is because vertical movement of the glass sheets is a bar to stable movement since the glass sheets are heavier. When a pair of glass sheets moves in the horizontal direction, the two glass sheets are apt to be out of alignment in the horizontal direction though the two glass sheets can easily maintain a certain gap therebetween. From this viewpoint, the two glass sheets can be prevented from being out of alignment in the horizontal direction by sucking and holding vertical portions on the glass sheets when the glass sheets are moving in the horizontal direction. From the viewpoint that the spacer is formed with high accuracy, it is effective to improve the positional accuracy of a portion of the glass sheets to have the resin material injected (i.e., a portion of the glass sheets confronting the die). Accordingly, it is preferable that the glass sheets on the first stage have at least the vertical portions close to the second stage sucked, and that the glass sheets on the second stage have at least the vertical portions close to the first stage sucked.

INDUSTRIAL APPLICABILITY

In accordance with the present invention, the die, which forms the resin spacer in the peripheral edge between two glass sheets, is provided between the first stage and the second stage, between which the two glass sheets are conveyed. The first holder, which maintains the gap between the two glass sheets on the first stage, is provided on the first stage, and the second holder, which maintains the gap between the two glass sheets on the second stage is provided on the second stage. The first guide, on which the two glass sheets on the first stage have lower edges put, is provided on the first stage, and the second guide, on which the two glass sheets on the second stage have lower edges put, is provided on the second stage. Thus, the moving positions of the glass sheets can be controlled with good accuracy while maintaining the gap between the two glass sheets. As a result, the resin spacer can be formed in the peripheral edge between the two glass sheets with good accuracy to provide a double glazing unit with air tightness ensured in a hollow space therebetween.

What is claimed is:

1. A method of preparing a double glazing unit, comprising:
   positioning a first glass sheet and a second glass sheet into a first stage movement apparatus;
   maintaining a fixed distance gap between the first glass sheet and the second glass sheet in the first stage movement apparatus with a stationary first holder using a suction force;
   moving the first and second glass sheets to a second stage movement apparatus by using a first driven guide located in the first stage movement apparatus, a second driven guide located in the second stage movement apparatus, and a suction chuck located on an actuator driven frame; and
   maintaining with suction the fixed distance gap while the first glass sheet and second glass sheet are moved;
   wherein the step of moving includes pulling the first and second glass sheets to the second stage movement apparatus by moving the suction chuck toward the first stage movement apparatus, affixing the suction chuck to the first and second glass sheets via suction, and pulling the suction chuck into the second stage movement apparatus.

2. The method of claim 1, further comprising:
   applying a resin between first vertical edges of the first glass sheet and second glass sheet inside the fixed distance gap;
   applying the resin between first horizontal edges of the first glass sheet and the second glass sheet inside the fixed distance gap while the first glass sheet and second glass sheet are moving from the first stage movement apparatus to the second stage movement apparatus;
   applying the resin between second vertical edges of the first glass sheet and second glass sheet inside the fixed distance gap; and
   applying the resin between second horizontal edges of the first glass sheet and second glass sheet inside the fixed distance gap while the first glass sheet and second glass sheet are moving from the second stage movement apparatus to the first stage movement apparatus.

3. The method of claim 1, further comprising:
   using the suction force to maintain a second fixed distance gap between the first glass sheet and the second glass sheet with a second holder when the first glass sheet and second glass sheet are in the second stage movement apparatus.

4. The method of claim 1, further comprising:
   using the first guide, second guide, and suction chuck to move the first glass sheet and second glass sheet from the second stage movement apparatus to the first stage movement apparatus.

5. The method of claim 1, wherein the stationary first holder comprises:
   a first pair of suction boxes configured to attract by suction force a first face of the first glass sheet; and
   a plurality of rollers configured to support the second sheet of glass.

6. The method of claim 5, wherein the first pair of suction boxes comprises:
   a first paired suction box; and
   a second paired suction box located substantially above the first paired suction box.

7. The method of claim 5, wherein the plurality of rollers support the second glass sheet at an angle of approximately 5 to 10 degrees from vertical.

8. The method of claim 7, wherein the stationary first holder further comprises:
   rollers attached to each of the first pair of suction boxes such that part of the rollers extends beyond the faces of the first pair of suction boxes facing the first sheet of glass.

9. The method of claim 8, wherein the stationary first holder further comprises:
   a first single suction box positioned on a half of the first stage movement apparatus closest to the second stage movement apparatus; and
   a second single suction box positioned symmetrically to the first single suction box about a parallel plane.

10. The method of claim 9, wherein the first single suction box and the second single suction box each has a length greater than a corresponding width along a direction of movement of the first and second glass sheets and are positioned such that the length is substantially perpendicular to the direction of movement of the first glass sheet and second glass sheet.

11. The method of claim 8, wherein a second holder of the second stage movement apparatus comprises:
   a first suction box positioned on a half of the second stage movement apparatus closest to the first stage movement apparatus; and
   a second suction box positioned substantially symmetrically to the first single suction box about a parallel plane.

12. The method of claim 11, wherein the first single suction box in the second stage movement apparatus and the second single suction box in the second stage movement apparatus each has a length greater than a corresponding width along a direction of movement of the first and second glass sheets and are positioned such that the length is substantially perpendicular to the direction of movement of the first glass sheet and second glass sheet.

13. The method of claim 1, wherein the stationary first holder comprises:
   a first pair of suction boxes configured to attract by suction force a first face of the first glass sheet; and
   a second pair of suction boxes configured to attract by suction force a first face of the second glass sheet and positioned substantially symmetrically to the first pair of suction boxes about a plane parallel to the first and second glass sheets and located between the first and second glass sheets.

14. The method of claim 13, wherein
   the first pair of suction boxes comprises a first paired suction box and a second paired suction box located substantially above the first paired suction box; and
   the second pair of suction boxes comprises a third paired suction box and fourth paired suction box located substantially above the third paired suction box.

15. The method of claim 13, wherein the stationary first holder further comprises:
   a first single suction box positioned on a half of the first stage movement apparatus closest to the second stage movement apparatus; and
   a second single suction box positioned symmetrically to the first single suction box about a parallel plane.

16. The method of claim 15, wherein the first single suction box and the second single suction box each has a length greater than a corresponding width along a direction of movement of the first and second glass sheets and are positioned such that the length is substantially perpendicular to the direction of movement of the first glass sheet and second glass sheet.

17. The method of claim 13, wherein the first pair of suction boxes comprises:

rollers attached to the first pair of suction boxes such that part of the rollers extends beyond the faces of the first pair of suction boxes facing the first glass sheet; and rollers attached to the second pair of suction box such that part of the rollers extends beyond the faces of the second pair of suction boxes facing the second glass sheet.

18. The method of claim 17, wherein a second holder of the second stage movement apparatus comprises:

a first single suction box positioned on a half of the second stage movement apparatus closest to the first stage movement apparatus; and a second single suction box positioned substantially symmetrically to the first single suction box about a parallel plane.

19. The method of claim 18, wherein the first single suction box in the second stage movement apparatus and the second single suction box in the second stage movement apparatus each has a length greater than a corresponding width along a direction of movement of the first and second glass sheets and are positioned such that the length is substantially perpendicular to the direction of movement of the first glass sheet and second glass sheet.

* * * * *